United States Patent [19]
Danziger et al.

[11] Patent Number: 5,389,255
[45] Date of Patent: Feb. 14, 1995

[54] MODULE FOR PERFORMING PERVAPORATION OF FLUIDS

[75] Inventors: René S. Danziger, Adliswil, Switzerland; Claus Gerrath, Langnau, Germany

[73] Assignee: Krebs & Co. AG, Switzerland

[21] Appl. No.: 64,512

[22] Filed: May 19, 1993

[30] Foreign Application Priority Data

May 27, 1992 [CH] Switzerland .................. 01720/92

[51] Int. Cl.⁶ ............................................. B01D 63/00
[52] U.S. Cl. ................... 210/321.75; 210/321.6; 210/321.84; 210/175; 210/461
[58] Field of Search ........... 210/321.6, 321.75, 321.84, 210/640, 231, 486, 459, 175, 180, 461

[56] References Cited

U.S. PATENT DOCUMENTS

| | | | |
|---|---|---|---|
| 3,398,091 | 8/1968 | Greatorex | 210/321.75 |
| 3,520,803 | 7/1970 | Iaconelli | 210/321.75 |
| 3,608,610 | 9/1971 | Greatorex | 210/321.84 |
| 3,695,444 | 10/1972 | Iaconelli | 210/541 |
| 4,323,455 | 4/1982 | Tanaka et al. | 210/321.75 |
| 4,650,574 | 3/1987 | Hilgendorff et al. | 210/180 |
| 4,936,954 | 6/1990 | Sander | 210/321.84 |

FOREIGN PATENT DOCUMENTS

| | | |
|---|---|---|
| 0118760 | 9/1984 | European Pat. Off. |
| 0164326 | 12/1985 | European Pat. Off. |
| 63-59310 | 3/1988 | Japan |
| 069506 | 3/1988 | Japan |
| 151305 | 6/1988 | Japan |
| 938127 | 10/1963 | United Kingdom |

*Primary Examiner*—Robert A. Dawson
*Assistant Examiner*—Ana M. Fortuna
*Attorney, Agent, or Firm*—Speckman, Pauley & Fejer

[57] ABSTRACT

A module having a plurality of chambers which are seated relatively close to each other in a flow-through reservoir having a feed inlet and an oppositely located retentate outlet. The chambers include pervaporation chambers which have a permeation-selective layer and heating chambers. The pervaporation chambers and the heating chambers are alternatingly disposed and supported in cutouts within comb-shaped supports. The flow-through reservoir is box-shaped and has removable, tightly secured longitudinal end walls, one of which supports all pervaporation chambers, the other of which supports all heating chambers. The module is highly efficient due to flow and temperature distribution conditions which remain extremely exact.

13 Claims, 3 Drawing Sheets

MODULE FOR PERFORMING PERVAPORATION OF FLUIDS

BACKGROUND OF THE INVENTION

1. Field of the Invention

This invention relates to a module for performing pervaporation of fluids, including a flow-through reservoir with a feed inlet and a retentate outlet and at least one plate-shaped pervaporation chamber, which is flat on both sides with a permeable membrane and at least one permeate outlet.

2. Description of Prior Art

Pervaporation is a membrane separation process, by which one or a plurality of components of a fluid mixture are separated by permeation. A component which is preferred in comparison with the other components diffuses through the permeation-selective membrane, over one side of which the fluid flows. The fluid which has been diffused is the permeate, while the remaining fluid is designated the retentate. It is customary to apply a vacuum to the permeate side of the membrane, which causes evaporation of the permeate.

Pervaporation is improved by the addition of heat, because this speeds up the diffusion process and because the evaporation of the permeate in the pervaporation chamber also speeds up, and finally, because the heat loss is compensated by the evaporation enthalpy. In this connection the homogeneity of the temperature distribution is extremely important.

A module for performing pervaporation of fluids is known from British Patent Disclosure GB-A-938,127. This module is particularly suited for the enrichment of uranium with the isotope 235 by means of diffusion. Accordingly, temperature control here is of less importance than for pervaporation in chemical process installations, for example, where it is intended to increase the purity of a fluid. The known module accordingly operates without heating chambers.

A module which additionally has a heating chamber is known from Japanese Patent Disclosure JP-A-63-59310. In this module two flow-through reservoirs are formed, which are bounded on one side by two permeable membranes and on the other side by a heating plate and the retentate side of the membrane is cooled. However, this does not permit an even temperature distribution in the fluid to be pervaporated. Furthermore, such a construction results in a disadvantageous relationship between the size and the amount of liquid to be fed through.

European Patent Publication EP-A-0,118,760 and U.S. Pat. No. 3,695,444 also disclose modules, which have a sandwich-like structure of heating chambers, pervaporation chambers and retetentate chambers resting against and delimiting each other. Such modules can be produced in a very compact manner, but are only suited for very small amounts of flow-through and, because of the meandering flow paths through a succession of chambers create a large flow resistance.

The module in accordance with European Patent Disclosure EP-A-0,164,326 has basically the same structure. The difference is that the respectively adjoining chambers are not disposed successively in the form of plates, but are concentrically interleaved.

SUMMARY OF THE INVENTION

It is one object of this invention to improve a module in such a way that there is a high fluid throughput in relation to the volume of the module at optimal temperature distribution.

The above object and others are achieved with a module in which each pervaporation chamber is located between two directly adjacent plate-shaped heating chambers, so that the fluid to be pervaporated is conducted between each pervaporation chamber and the adjoining heating plates in a gap. Such an arrangement permits dense packing of alternating heating chambers and pervaporation chambers, which are maintained in the flow-through reservoir without touching each other, resulting in an even flow of the fluid, and also makes possible optimal temperature distribution with a large amount of throughput.

A particularly advantageous embodiment of this invention can be produced at low cost and is optimal in assembling and maintaining, because the heating chambers, accessible from one side, and the pervaporation chambers, accessible from the other side, are arranged in a comb shape in the flow-through reservoir, and therefore can be exchanged.

It is advantageous to provide comb-shaped supports in the flow-through reservoir for exact seating of the chambers with respect to each other.

According to another preferred embodiment of this invention there is a run free of distortions of all walls of the flow-through reservoir, and thus exact flow conditions are assured. The same is also achieved by another preferred embodiment of the pervaporation chambers and heating chambers wherein it is possible with appropriate grids to absorb deformations caused by overpressure or underpressure in the respective chambers.

The disposition of several inlet and outlet connections on the heating and pervaporation chambers also leads to the improvement of the flow and temperature control conditions. One preferred embodiment of the module of the invention is not limited to cubic shapes of the flow-through reservoir.

The individual parts of a preferred embodiment of the module for the pervaporation of fluids in accordance with the invention are illustrated in the accompanying drawings and will be explained in the description below.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
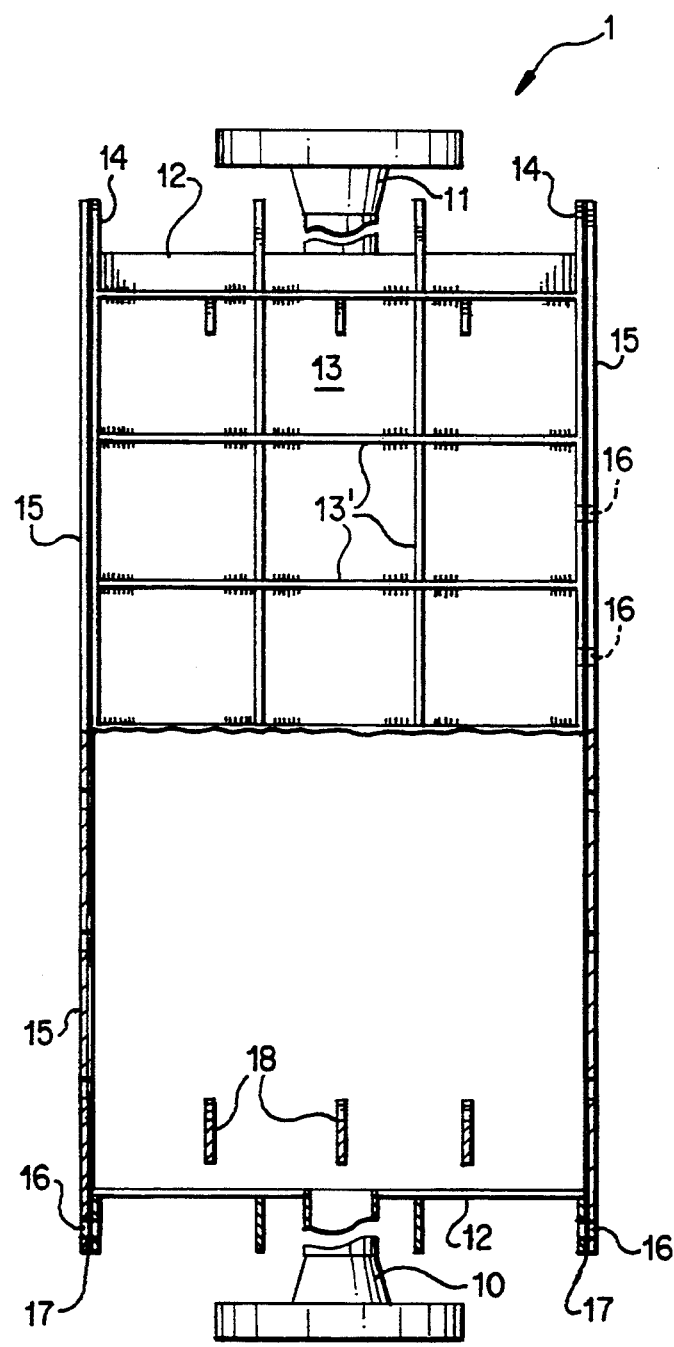
FIG. 1 shows a flow-through reservoir in a partial cross-sectional top view.

The module for performing the pervaporation of fluids in accordance with this invention has three essential components: a flow-through reservoir 1, in which one or a plurality of pervaporation chambers 2 and a plurality of heating chambers 3 are disposed. In the simplest form of the embodiment, one pervaporation chamber 2, placed between two heating chambers 3, is provided in the flow-through reservoir 1. In this case the flow-through reservoir 1 has the shape of a flat cuboid box, and the different chambers 2, 3 have the shape of plates. Such an embodiment is shown in detail in the drawings.

However, this invention is not limited to such an embodiment. It is possible, for example, for the flow-through reservoirs 1 to have the shape of a cylinder. In such an embodiment the plate-shaped pervaporation and heating chambers 2, 3 can be disposed adjoining each other in alternation and radially extending in the shape of a star. In such an embodiment, which is not shown in the drawings, it is possible, for example, to arrange all heating chambers 3 or all pervaporation chambers 2 on an axial support connecting them, via the latter, to be centrally supplied or to a vacuum pump. The cylinder wall of the flow-through reservoir 1 then can be used as the support for the other chambers 2, 3. Such an embodiment will not be further discussed, because the shape of the chambers in particular and their relative disposition in respect to each other remains unaffected. It is only required that the chambers increase in thickness from the cylinder axis towards the cylinder wall, so that the gaps between the chambers are the same all over and the fluid flows through evenly everywhere.

Figure 2:
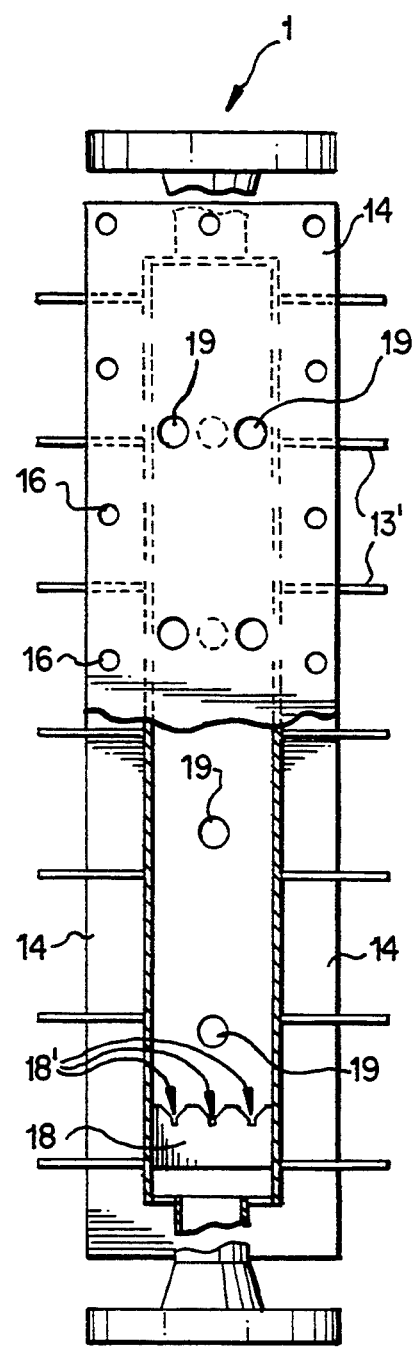
FIG. 2 shows the flow-through reservoir in a partial cross-sectional side view.

The flow-through reservoir 1 is preferably embodied in the shape of a cuboid box, as shown in FIGS. 1 and 2. The former has a feed inlet 10 and a retentate outlet 11. The feed inlet 10 and the retentate outlet 11 are disposed opposite each other on the short end walls of the box-shaped flow-through reservoir 1. The fluid to be pervaporated continuously flows through the flow-through reservoir 1 from the feed inlet 10 to the retentate outlet 11.

The two short end walls 12 are firmly connected with, preferably welded, two front walls 13 on the front and back of the reservoir 1. Each of the edges of the front walls 13 are bent at right angles in the area of their side boundaries to form a circumferential flange 14. These two flanges 14 form the support surfaces for the long, side longitudinal end walls 15. The two longitudinal end walls 15 are removably fastened in the form of lids on the flanges 14 by means of screw connections 16. A seal 17 is inserted in the area of the overlap of the longitudinal end walls 15 and the circumferential flanges 14. To reinforce the large areas of the front walls 13, grid-shaped stiffening ribs 13' are welded on. These stiffening ribs 13' can only be seen in the upper area in FIG. 1, because the lower part of the flow-through reservoir 1 is shown in section.

A plurality of parallel, comb-shaped supports 18 are welded into the bottom of the box-shaped flow-through reservoir 1, in which the pervaporation chambers 2 and the heating chambers 3, yet to be described, are supported. In the example shown, three cuts 18' are made in the comb-shaped supports 18 to receive a central pervaporation chamber 2 and two outside heating chambers 3, not shown in FIGS. 1 and 2.

Correspondingly, inlet and outlet openings 19 are cut in the removable longitudinal end wall 15. Two inlet and outlet openings 19 are provided per chamber to achieve a temperature distribution as evenly as possible. The inlet and outlet openings 19 for the pervaporation chamber 2 are cut in the one lid longitudinal end wall, and the ones for the heating chambers 3 in the other longitudinal end wall. This makes it possible to fasten the heating chambers 3 on one longitudinal end wall 15 and the pervaporation chamber 2 on the other, so that two insertion elements are formed in this manner. This is particularly advantageous for servicing the module.

Figure 3:
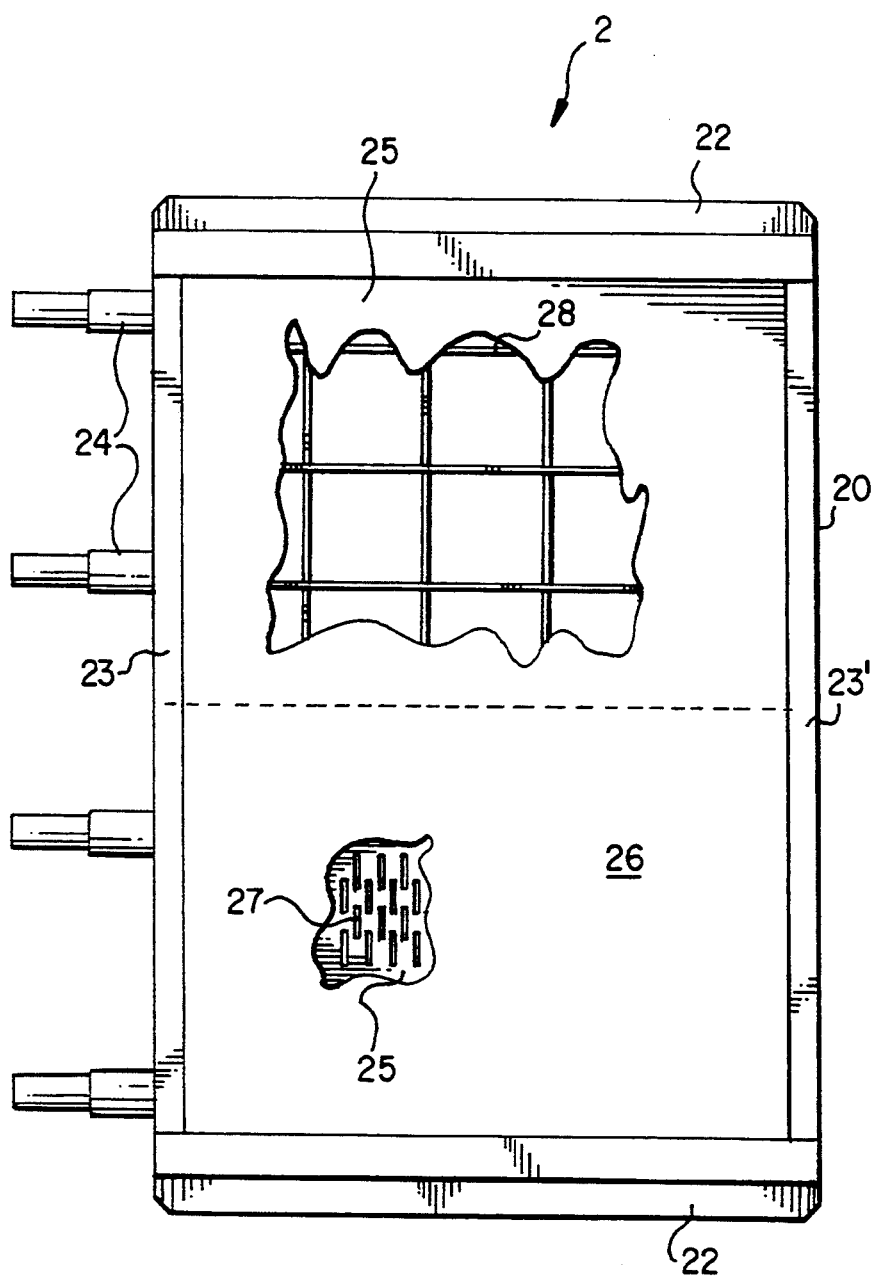
FIG. 3 shows a pervaporation chamber in a top view.
Figure 4:
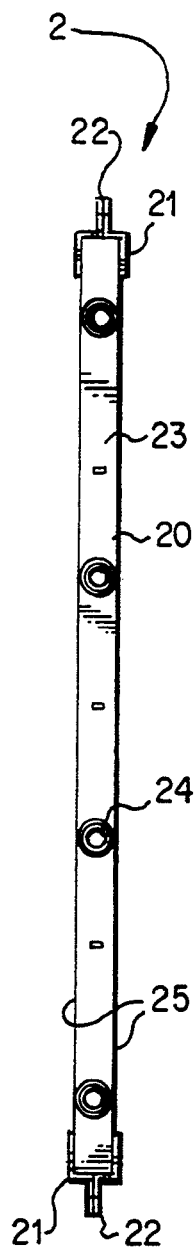
FIG. 4 shows the pervaporation chamber of FIG. 3 in a side view.

The pervaporation chamber 2 is illustrated in detail in FIGS. 3 and 4. The peraporation chamber 2 comprises a frame structure 20, the upper and lower strips 21 of which are each provided with a retaining comb 22. These retaining combs 22 are of such size that they can be inserted into the cuts 18' in the support 18 of the flow-through reservoir 1. One of the longitudinal strips 23 has an inlet connector 24, while the opposite longitudinal strip 23' is completely closed.

Sheet metal supports 25 are disposed inside the frame structure, sealingly connected with the strips 22, 23 and 23', which are covered with a permeation-selective membrane 26 on the retentate side. This membrane 26 is shown partially cut away in FIG. 3, so that the perforation 27 in the sheet metal supports 25 can be seen. In general, instead of sheet metal supports 25, support surfaces can be used comprising either expanded metal, metal mesh or sintered synthetic, ceramic or metallic material with sufficient porosity.

A grid 28 which absorbs the pressure is inserted between the two support surfaces 25 and the perforated sheet metal supports 25, as shown in FIG. 3. This is essential for maintaining the gap width between a heating chamber 3 and the adjoining pervaporation chamber 2 as evenly as possible, so that the flow conditions of the retentate in the gap remain as even as possible. The permeate or the permeate vapor is drawn off via the outlet connector 24. Condensation of the permeate only takes place outside of the module of this invention.

Figure 5:
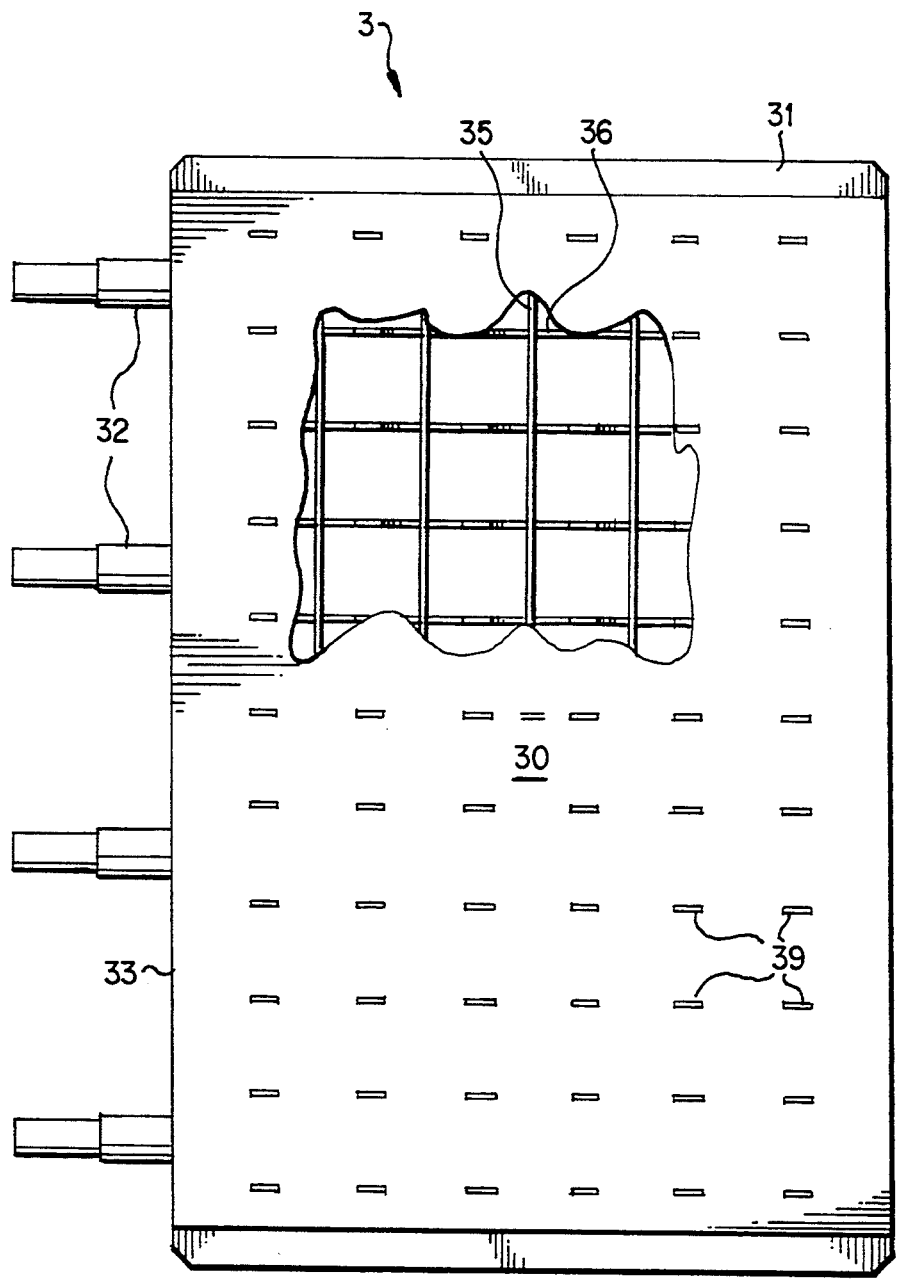
FIG. 5 shows a heating chamber in a top view.
Figure 6:
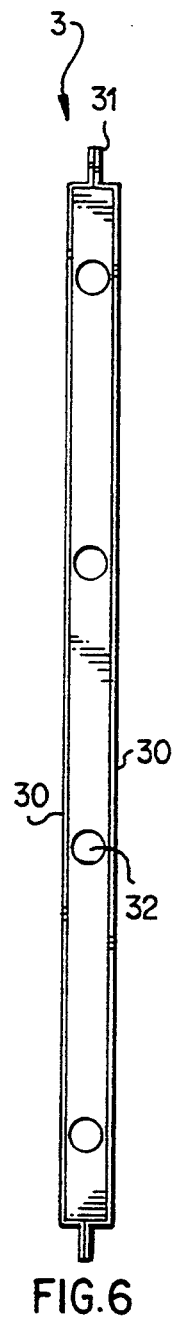
FIG. 6 shows the heating chamber of FIG. 5 in a side view.
Figure 7:
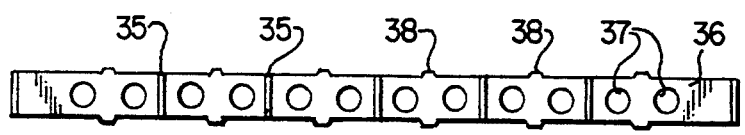
FIG. 7 shows a side view of a screen placed in the heating chambers.

A heating chamber 3 of the module of this invention is shown in detail in FIGS. 5 to 7. It comprises two sheet metal pieces which are directly connected with each other along the long edges and which are also shaped and welded at the upper and lower edges into a retaining comb 31 which can be inserted into the cuts 18' of the comb-shaped supports 18. Inlet and outlet connectors 32 are provided in the one longitudinal end wall 33, which are used for conducting the heating medium. Here too, the absolutely flat course of the sheet metal pieces 30 is eminently important, again for keeping the gap width with the adjoining pervaporation chamber 2 constant. A grid-shaped screen 34, which absorbs the tensile load, is disposed in the heating chamber 3 for this purpose. It comprises longitudinal strips 35 and cross strips 36 placed in the shape of a cross. These strips have flow-through openings 37. In addition, the cross strips 36 have cams 38 which are at least as high as the sheet metal pieces 30 are thick. Stamped-out parts 39 are provided in the sheet metal pieces 30 to correspond with the grid of the cams 38, in which the cams 38 fit in a positively locking manner. It is of course necessary to maintain the cams 38 in the stamped-out parts 39 in a sealing manner.

It is possible to obtain a very narrow gap between the adjoining chambers by means of the special construction of the individual chambers. The gap between the two outer heating chambers 3 and the front wall 13 can approach zero. In this way no separate guidance for the fluid to be pervaporated is required. A relatively simple module of high efficiency and excellent maintenance properties is realized in this way.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. In a module for performing pervaporation of fluids, having a feed inlet (10) and a retentate outlet (11) and at least one plate-shaped pervaporation chamber (2) each of which has a flat permeable membrane (26) on both sides and at least one permeate outlet, wherein each pervaporation chamber (2) is positioned between two adjacent plate-shaped heating chambers (3), the improvement comprising: each said pervaporation chamber (2) and said heating chambers (3) being self-supporting enclosed chambers maintained at a spaced distance with respect to each other in a closed flow-through reservoir (1) whereby the fluid to be pervaporated flows in a gap formed between each said pervaporation chamber (2) and a correspondingly adjacent said heating chamber (3) in a flow direction from said feed inlet (10) to said retentate outlet (11);

said flow-through reservoir (1) shaped as a rectangular box, said feed inlet (10) and said retentate outlet (11) positioned on two opposite narrow end walls (12) of said rectangular box, one longitudinal end wall (15) of said rectangular box supporting said heating chambers (3) and an opposite longitudinal end wall (15) supporting each said pervaporation chamber (2), and both said longitudinal end walls (15) sealingly mounted within said flow-through reservoir (1); and a plurality of comb-shaped supports (18) positioned within said flow-through reservoir (1), and said heating chambers (3) and each said pervaporation chamber (2) supported on said comb-shaped supports (18).

2. In a module in accordance with claim 1, wherein two front surfaces (13) of said flow-through reservoir (1) have stiffening ribs (13') extending in a grid-shaped manner and have a circumferential flange (14) extending away from said front surfaces (13) at right angles, and said longitudinal end walls (15) are secured to said circumferential flange (14).

3. In a module in accordance with claim 1, wherein each said pervaporation chamber (2) comprises two perforated support surfaces (25) connected with each other and covered with a permeable material (26), and a grid (28) is positioned between said perforated support surfaces (25).

4. In a module in accordance with claim 1, wherein each said heating chamber (3) comprises two stamped sheet metal pieces (30) connected with each other, a perforated grid (35, 36) has a plurality of cams (38) which fit into a plurality of stamped-out parts (39) of said sheet metal pieces (30), and said perforated grid (35, 36) is positioned between said sheet metal pieces (30) in a form-fitting manner.

5. In a module in accordance with claim 1, wherein each said pervaporation chamber (2) has a plurality of outlet connectors (24) on a longitudinal strip (23).

6. In a module in accordance with claim 1, wherein each said heating chamber (3) has a plurality of inlet and outlet connectors (32) on a heating chamber longitudinal end wall (33).

7. In a module for performing pervaporation of fluids, having a feed inlet (10) and a retentate outlet (11) and at least one plate-shaped pervaporation chamber (2) each of which has a flat permeable membrane (26) on both sides and at least one permeate outlet, wherein each pervaporation chamber (2) is positioned between two adjacent plate-shaped heating chambers (3), the improvement comprising: each said pervaporation chamber (2) and said heating chambers (3) being self-supporting enclosed chambers maintained at a spaced distance with respect to each other in a closed flow-through reservoir (1) whereby the fluid to be pervaporated flows in a gap formed between each said pervaporation chamber (2) and a correspondingly adjacent said heating chamber (3) in a flow direction from said feed inlet (10) to said retentate outlet (11); and a plurality of comb-shaped supports (18) positioned within said flow-through reservoir (1), and said heating chambers (3) and each said pervaporation chamber (2) supported on said comb-shaped supports (18).

8. In a module in accordance with claim 7, wherein two front surfaces (13) of said flow-through reservoir (1) have stiffening ribs (13') extending in a grid-shaped manner and have a circumferential flange (14) extending away from said front surfaces (13) at right angles, and said longitudinal end walls (15) are secured to said circumferential flange (14).

9. In a module in accordance with claim 7, wherein each said pervaporation chamber (2) comprises two perforated support surfaces (25) connected with each other and covered with a permeable material (26), and a grid (28) is positioned between said perforated support surfaces (25).

10. In a module in accordance with claim 7, wherein each said heating chamber (3) comprises two stamped sheet metal pieces (30) connected with each other, a perforated grid (35, 36) has a plurality of cams (38) which fit into a plurality of stamped-out parts (39) of said sheet metal pieces (30), and said perforated grid (35, 36) is positioned between said sheet metal pieces (30) in a formfitting manner.

11. In a module in accordance with claim 7, wherein each said pervaporation chamber (2) has a plurality of outlet connectors (24) on a longitudinal strip (23).

12. In a module in accordance with claim 7, wherein each said heating chamber (3) has a plurality of inlet and outlet connectors (32) on a heating chamber longitudinal end wall (33).

13. In a module in accordance with claim 7, wherein said flow-through reservoir (1) has a cylindrical shape, and said heating chambers (3) and each said pervaporation chamber (2) are in an alternating radially extending manner adjacent each other.

* * * * *